United States Patent
Han et al.

(10) Patent No.: US 7,653,713 B2
(45) Date of Patent: Jan. 26, 2010

(54) METHOD OF MEASURING ROUND TRIP TIME AND PROXIMITY CHECKING METHOD USING THE SAME

(75) Inventors: Sung-hyu Han, Seoul (KR);
Myung-sun Kim, Uiwang-si (KR);
Young-sun Yoon, Suwon-si (KR);
Sun-nam Lee, Suwon-si (KR);
Bong-seon Kim, Seongnam-si (KR);
Jae-heung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 438 days.

(21) Appl. No.: 11/340,794

(22) Filed: Jan. 27, 2006

(65) Prior Publication Data

US 2007/0192480 A1    Aug. 16, 2007

Related U.S. Application Data

(60) Provisional application No. 60/654,955, filed on Feb. 23, 2005.

(30) Foreign Application Priority Data

Apr. 22, 2005    (KR) ...................... 10-2005-0033544

(51) Int. Cl.
*G06F 15/16*    (2006.01)
(52) U.S. Cl. ........................ 709/223; 709/227; 713/169
(58) Field of Classification Search ......... 709/200–202, 709/220–224, 227; 713/169–172
See application file for complete search history.

(56) References Cited

U.S. PATENT DOCUMENTS

| | | | |
|---|---|---|---|
| 6,789,193 | B1 | 9/2004 | Heiden |
| 2002/0120838 | A1* | 8/2002 | Abdulkader ................. 713/153 |
| 2002/0178358 | A1* | 11/2002 | Perkins et al. .............. 713/169 |
| 2006/0041642 | A1* | 2/2006 | Rosner et al. ............... 709/220 |

FOREIGN PATENT DOCUMENTS

| | | |
|---|---|---|
| JP | 2004-207965 A | 7/2004 |
| KR | 2000-0038184 A | 7/2000 |
| KR | 2001-0066452 A | 7/2001 |
| KR | 2002-0040378 A | 5/2002 |
| KR | 10-2004-0013966 A | 2/2004 |
| KR | 10-2004-0039902 A | 5/2004 |
| KR | 10-2005-0000481 A | 1/2005 |
| LR | 10-2004-0050428 A | 6/2004 |
| WO | 2005/010770 A1 | 2/2005 |

* cited by examiner

*Primary Examiner*—Moustafa M Meky
(74) *Attorney, Agent, or Firm*—Sughrue Mion, PLLC

(57) ABSTRACT

A method of measuring round trip time (RTT) and a proximity checking method using the same. The method of measuring RTT includes: transmitting a hashed second random number and starting the RTT measurement; and receiving a hashed first random number from a device that received the hashed second random number and ending the RTT measurement, thereby greatly reducing repetitive encryption and decryption operations in the proximity check using a repetitive RTT measurement.

13 Claims, 5 Drawing Sheets

METHOD OF MEASURING ROUND TRIP TIME AND PROXIMITY CHECKING METHOD USING THE SAME

This application claims priority from U.S. Patent Application No. 60/654,955, filed on Feb. 23, 2005 in the U.S. Patent Trademark Office and from Korean Patent Application No. 10-2005-0033544, filed on Apr. 22, 2005, in the Korean Intellectual Property Office, the disclosures of which are incorporated herein in their entirety by reference.

BACKGROUND OF THE INVENTION

1. Field of the Invention

Methods consistent with the present invention relate to measuring round-trip-time (RTT) and proximity checking using the same.

2. Description of the Related Art

FIG. 1A is an exemplary diagram illustrating contents transmission. Referring to FIG. 1A, contents are transmitted to a device A from a contents provider CP. The device A is authorized to access the contents. Unlimited distribution of the contents to a device C may not be allowed, even if the contents are transmitted by an authorized user. For example, if the device A functions as a home server of the home network HN, the contents are transmitted within the home network HN. The home network HN includes a device B but not the device C.

Proximity checking is widely used to prevent unlimited distribution of contents.

Proximity checking is performed to determine the proximity between a device (hereinafter referred to as "sink device") that receives contents (or information whose unlimited distribution is not allowed) and a device (hereinafter referred to as "source device") which transmits the contents. If both devices are determined to be proximate to each other, contents transmission is allowed; if not, contents transmission is not allowed.

The proximity check is performed using round-trip-time (RTT). The source device measures RTT to the sink device, determines whether the measured RTT is smaller than a critical RTT, and if the measured RTT is determined to be smaller than the critical RTT, determines that the source device and the sink device are proximate to each other. For example, if the critical RTT is 7 ms, the range of the content distribution is restricted to an apartment area.

FIG. 1B is a flowchart illustrating a conventional method of measuring RTT. Referring to FIG. 1B, in Operation 110, a device A generates a first random number R1, and securely transmits the generated first random number R1 to a device B. The term "securely" means that although an external attacker may intercept a message, the first random number R1 cannot be obtained by the external attacker. Such a secure transmission is performed using a public key infrastructure (PKI).

In Operation 120, the device B transmits an acknowledge message OK to the device A.

In Operation 130, the device A generates a second random number R2, transmits the generated second random number R2, and starts a timer for measuring RTT.

In Operation 140, the device B receives the second random number R2 from the device A, generates R1⊕R2, and transmits the generated R1⊕R2 to the device A. The ⊕ means an XOR operation.

The device A receives the R1⊕R2 from the device B, ends the timer, and measures RTT. The device B does not transmit the second random number R2 but R1⊕R2 to the device A in order to prevent an attacker from intercepting the message between the devices A and B, transmitting a new message to the device A or device B, and faking RTT.

However, the conventional method of measuring RTT needs to securely transmit the first random number R1 for one-time RTT measurement every time. That is, the device A encrypts the first random number R1 using a public key of the device B and decrypts the encrypted first random number using its own private key, thereby obtaining the first random number.

The RTT measurement for one-time proximity checking is repeatedly performed several tens of times through several thousands of times. This is because, if one of the measured RTTs is smaller than the critical RTT, after the RTT is measured several tens of times through several thousands of times, the devices A and B are considered to be proximate to each other due to variability of traffic on a transmission path. However, since the conventional method of measuring RTT must perform encryptions and decryptions several tens of times through several thousands of times for the one-time proximity check, it is very inefficient and places considerable load on both systems of the devices A and B.

SUMMARY OF THE INVENTION

Aspects of the present invention provide a method of measuring round trip time (RTT) that reduces encryption and decryption processes in a proximity check that uses a repetitive RTT measurement, by which measuring time and efficiency are increased, and a proximity checking method using the same.

According to an aspect of the present invention, there is provided a method of measuring round trip time (RTT), the method comprising: transmitting a hashed second random number and starting the RTT measurement; and receiving a hashed first random number from a device that received the hashed second random number and ending the RTT measurement.

According to another aspect of the present invention, there is provided a computer-readable storage medium having embodied thereon a computer program for executing the method of measuring RTT.

According to another aspect of the present invention, there is provided a proximity check method comprising: transmitting a hashed second random number and starting the RTT measurement; receiving a hashed first random number from a device that received the hashed second random number and ending the RTT measurement; and checking the proximity of the device based on the measured RTT.

According to another aspect of the present invention, there is provided a computer-readable storage medium having embodied thereon a computer program for executing the proximity check method discussed above.

According to another aspect of the present invention, there is provided a method of supporting an RTT measurement, the method comprising: receiving a hashed second random number corresponding to a RTT measurement start; and transmitting a hashed first random number corresponding to a RTT measurement end to a device that transmitted the hashed second random number.

According to another aspect of the present invention, there is provided a computer-readable storage medium having embodied thereon a computer program for executing the method of supporting an RTT measurement.

According to another aspect of the present invention, there is provided a method of measuring RTT, the method comprising: first and second devices generating first and second random numbers, respectively, and securely exchanging the generated first and second random numbers; and the first and second devices transmitting to and receiving from each other hashed first and second random numbers to measure the RTT.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF EXEMPLARY EMBODIMENTS OF THE INVENTION

Exemplary embodiments of the present invention will now be described more fully with reference to the accompanying drawings.

Figure 1A:
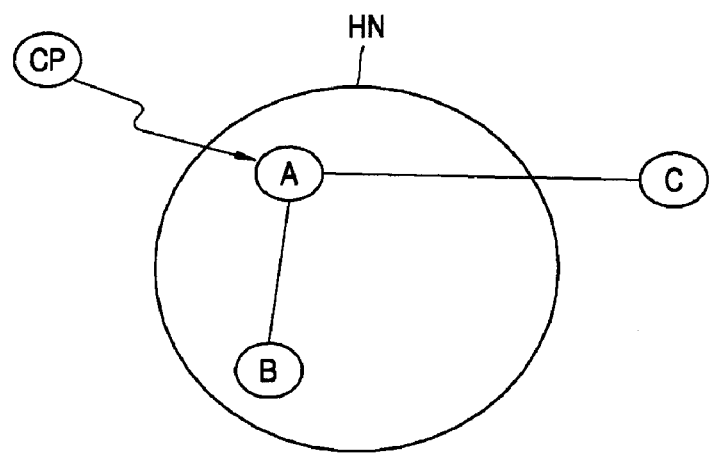
FIG. 1A is an exemplary diagram illustrating conventional contents transmission.
Figure 1B:
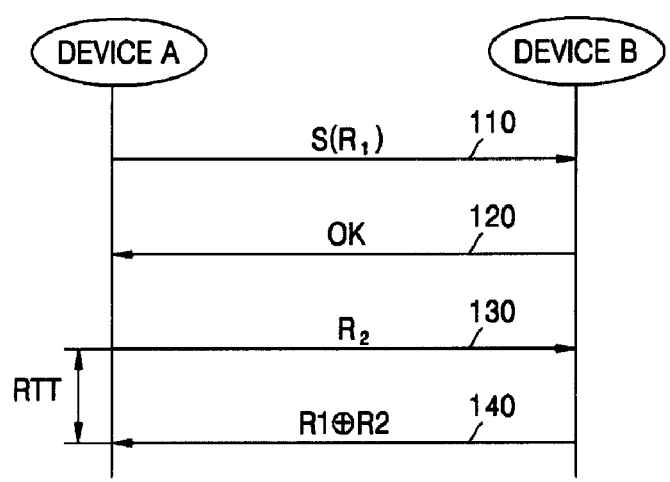
FIG. 1B is a flowchart illustrating a conventional method of measuring round trip time (RTT)
Figure 2:
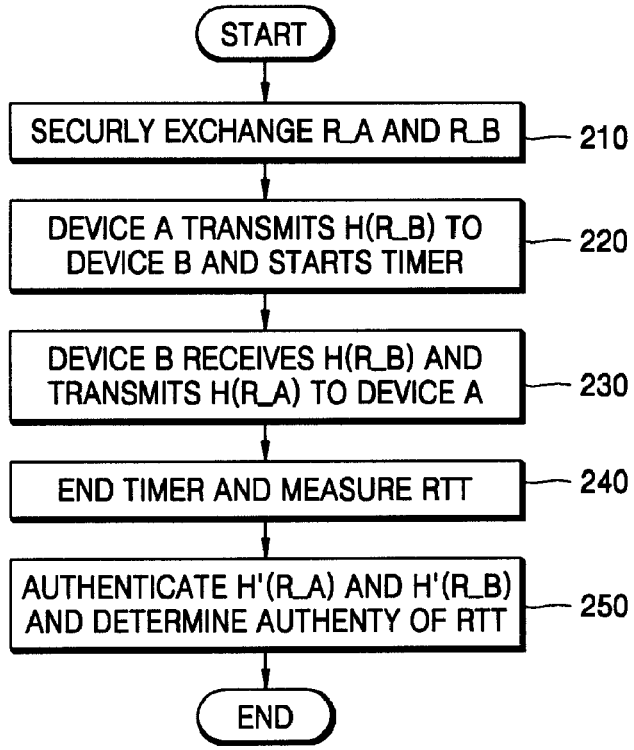
FIG. 2 is a flowchart illustrating a method of measuring RTT according to an exemplary embodiment of the present invention.

FIG. 2 is a flowchart illustrating a method of measuring RTT according to an exemplary embodiment of the present invention, in which a device A measures round trip time (RTT) of a device B in order to perform a proximity check of the device B.

Referring to FIG. 2, in Operation 210, the device A generates a first random number R_A, the device B generates a second random number R_B and both devices securely exchange the generated first and second random numbers R_A and R_B.

The term "securely" means that the first and second random numbers R_A and R_B respectively, are transmitted to the device A or the device B without being obtained by an external attacker. Such a secure transmission is performed using a public key infrastructure (PKI) or a private key infrastructure, which will be described below in detail.

In Operation 220, the device A hashes the second random number R_B to obtain a hashed second random number H(R_B), transmits the generated hashed second random number H(R_B) to the device B, and starts a timer for measuring RTT.

In Operation 230, the device B receives the hashed second random number H(R_B) and transmits a hashed first random number H(R_A) to the device A.

In Operation 230, an attacker device C can intercept the hashed random numbers H(R_A) and H(R_B) in order to fake the measured RTT. To be more specific, the attacker device C, which is in the middle of the devices A and B, could intercept the hashed second random number H(R_B), which is transmitted from the device A to the device B, and could transmit an optional random number to the device A, before the device B transmits the hashed first random number H(R_A) to the device A, in order to reduce the measured RTT. Alternatively, the attacker device C could transmit the optional random number to the device B while hiding its own existence from the devices A and B, in order to simulate a normal RTT measurement algorithm.

In Operation 230, the attacker device C cannot determine whether the hashed random numbers H(R_A) and H(R_B), which are received by the devices A and B, respectively, are authentic. In this regard, the hashed first random number H(R_A) received by the device A is referred to as "pseudo-hashed first random number H'(R_A)" and the hashed second random number H(R_B) received by the device and B is referred to as "pseudo-hashed second random number H'(R_B)".

In Operation 240, the device A receives the pseudo-hashed first random number H'(R_A), stops the timer, and measures RTT.

In Operation 250, the device A authenticates the pseudo-hashed first random number H'(R_A) using the first random number R_A, and the device B authenticates the pseudo-hashed second random number H'(R_B) using the second random number R_B. If both authentications performed by the device A and the device B are successful, then the RTT obtained by measuring in Operation 240 is determined to be authentic. The device A authenticates that the pseudo-hashed first random number H'(R_A) corresponds to the first random number R_A, and the device B authenticates that the pseudo-hashed second random number H'(R_B) corresponds to the second random number R_B.

In Operation 250, if both authentications are not successful, the RTT obtained by measuring in Operation 240 is determined to be fake, and thus the RTT faked by the attacker device C is determined to be unauthentic.

Operation 250 will be described in detail below with reference to FIG. 4.

Figure 3:
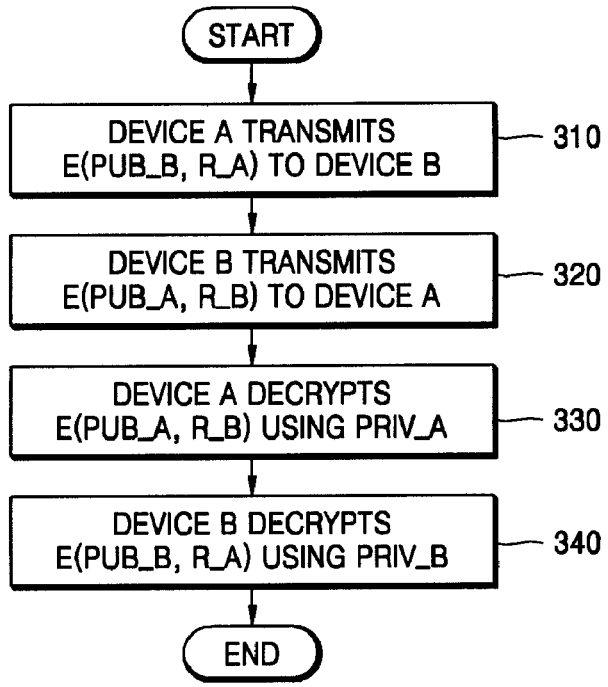
FIG. 3 is a flowchart for explaining Operation 210, which is shown in FIG. 2.

FIG. 3 is a flowchart for explaining Operation 210 shown in FIG. 2. The secure transmission of the first random number R_A and the second random number R_B is performed using the public key infrastructure (PKI) or the private key infrastructure in Operation 210 shown in FIG. 2. Operation 210 shown in FIG. 2 includes Operations 310 through 340, described below with respect to FIG. 3, when the PKI is used for the secure transmission.

In Operation 310, the device A generates the first random number R_A, encrypts the first random number R_A using a public key PUB_B of the device B to obtain an encrypted first random number E(PUB_B, R_A), and transmits the generated encrypted first random number E(PUB_B, R_A) to the device B.

In Operation 320, the device B generates the second random number R_B, encrypts the second random number R_B using a public key PUB_A of the device A to obtain an encrypted second random number E(PUB_A, R_B), and transmits the generated second random number E(PUB_A, R_B) to the device A.

In Operation 330, the device A decrypts the encrypted second random number E(PUB_A, R_B), which was received in Operation 320, using its own private key PRIV_A, to obtain the second random number R_B.

In Operation 340, the device B decrypts the encrypted first random number E(PUB_B, R_A), which was received in Operation 310, using its own private key PRIV_B, to obtain the first random number R_A.

In a modified exemplary embodiment, the first and second random numbers can be encrypted using a secret key which is securely shared by the device A and the device B. Since the secret key is a symmetrical key, the public key or the private key used in Operations 310 and 340 can be replaced with the secret key.

Figure 4:
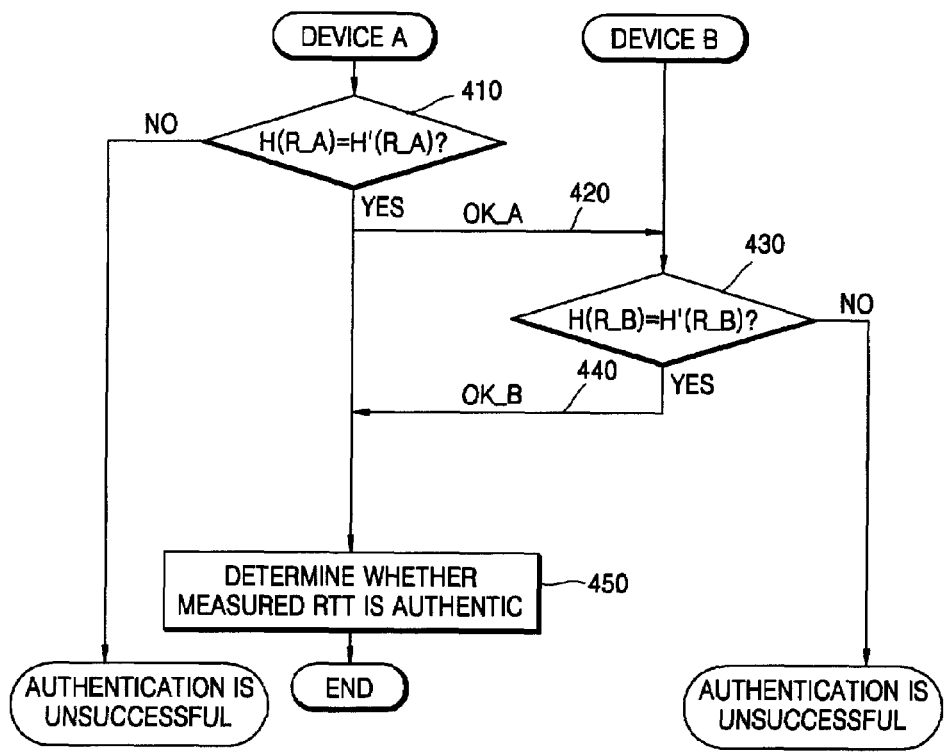
FIG. 4 is a flowchart for explaining Operation 250, which shown in FIG. 2.

FIG. 4 is a flowchart for explaining Operation 250 shown in FIG. 2. The authentication of Operation 250 shown in FIG. 2 is performed in Operations 410, 420, 430 and 440.

In Operation 410, the device A hashes the first random number R_A generated in Operation 210 shown in FIG. 2 to obtain the hashed first random number H(R_A), and determines whether the pseudo-hashed first random number H'(R_A) received in Operation 240 shown in FIG. 2 is identical to the hashed first random number H(R_A). If the device A determines that they are identical to each other, then Operation 420 is performed. If the device A determines that they not identical to each other, it determines the authentication to be unsuccessful and determines the RTT, obtained by measuring in Operation 240 shown in FIG. 2, to be unauthentic.

In Operation 420, the device A transmits a first authentication success message OK_A to the device B.

In Operation 430, the device B receives the first authentication success message OK_A from the device A, obtains the hashed second random number H(R_B) by hashing the second random number R_B, which was generated in Operation 210 shown in FIG. 2, and determines whether the pseudo-hashed second random number H'(R_B), which was received in Operation 230 shown in FIG. 2, is identical to the hashed second random number H(R_B). If the device B determines that they are identical to each other, then Operation 440 is performed. If the device B determines that they are not identical to each other, it determines the authentication to be unsuccessful and terminates the authentication.

In Operation 440, the device B transmits a second authentication success message OK_B to the device A.

In Operation 450, the device A receives the second authentication success message OK_B from the device B and determines the RTT, obtained by measuring in Operation 240, shown in FIG. 2, to be authentic.

Figure 5:
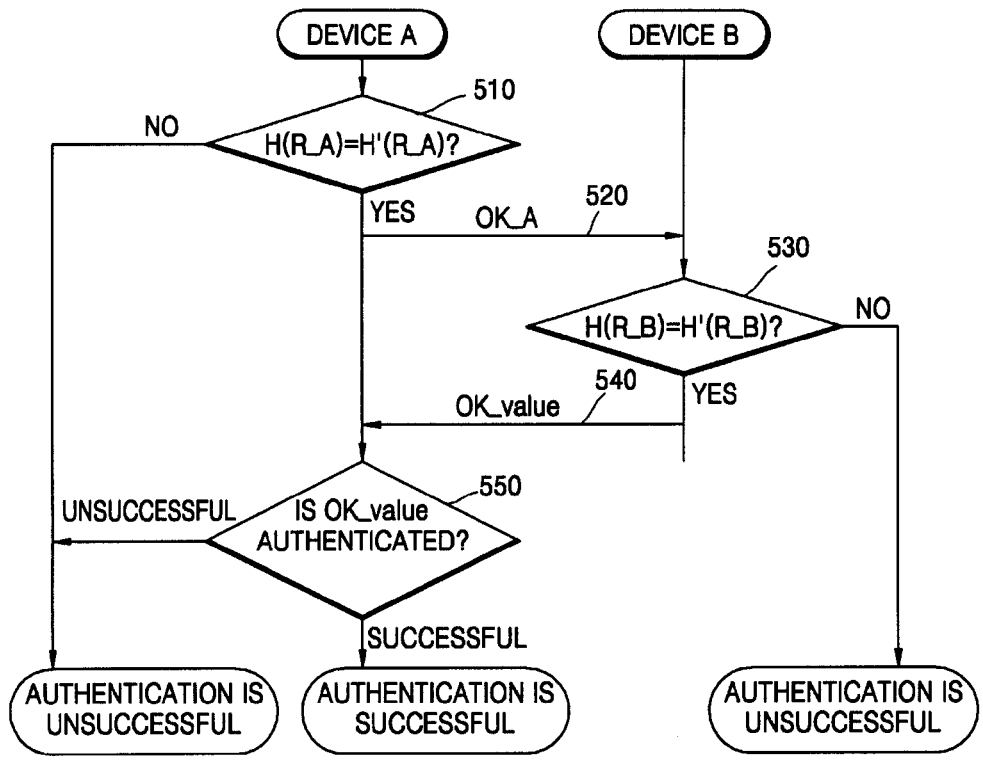
FIG. 5 is another flowchart for explaining Operation 250, which is shown in FIG. 2.

FIG. 5 is another flowchart for explaining Operation 250 shown in FIG. 2. The authentication of Operation 250 shown in FIG. 2 is performed in Operations 510, 520, 530, 540 and 550.

In Operation 510, the device A hashes the first random number R_A, which was generated in Operation 210 shown in FIG. 2, to obtain the hashed first random number H(R_A), and determines whether the pseudo-hashed first random number H'(R_A), which was received in Operation 240 shown in FIG. 2, is identical to the hashed first random number H(R_A). If the device A determines that they are identical to each other, Operation 520 is performed. If the device A determines that they are not identical to each other, it determines the authentication to be unsuccessful and determines the RTT, obtained by measuring in Operation 240 shown in FIG. 2, to be unauthentic.

In Operation 520, the device A transmits a first authentication success message OK_A to the device B.

In Operation 530, the device B receives the first authentication success message OK_A from the device A, obtains the hashed second random number H(R_B) by hashing the second random number R_B, which was generated in Operation 210 shown in FIG. 2, and determines whether the pseudo-hashed second random number H'(R_B), which was received in Operation 230 shown in FIG. 2, is identical to the hashed second random number H(R_B). If the device B determines that they are identical to each other, Operation 540 is performed. If the device B determines that they are not identical to each other, it determines the authentication to be unsuccessful and terminates the authentication.

In Operation 540, the device B creates an authentication success message value OK_value and transmits the authentication success message value OK_value to the device A. The authentication success message value OK_value cannot be modified or copied when it is hacked by the external attacker.

The authentication success message value OK_value can be created by hashing a secret value s. The secret value s is securely shared by the devices A and B as shown below:

$$\text{OK\_value} = H(s) \quad \text{(Equation 1)}$$

wherein, OK_value denotes the authentication success message value, H( ) denotes a hash function, and s denotes the secret value.

The secret value s can be created using the first random number R_A or the second random number R_B. For example, the secret value s can be created by inputting the first random number R_A into a generation function f( ). There is no restriction on the generation function f( ), except that it is shared by the device A and the device B. For example, the authentication success message value OK_value can be created as shown below:

$$\text{OK\_value} = H(s) = H(f(R\_A)) = H(R\_A \oplus 1) \quad \text{(Equation 2)}$$

wherein, OK_value denotes the authentication success message value, H( ) denotes a hash function, f( ) denotes a modification function, and $\oplus$ denotes an XOR operation.

In Operation 550, the device A receives the authentication success message value OK_value from the device B and authenticates the authentication success message value OK_value. If the device A determines that authentication is successful, it determines the RTT, obtained by measuring in Operation 240 shown in FIG. 2, to be authentic. The authentication is based on identity of the secret value shared by the device A and the device B.

To be more specific, the authentication success message value OK_value, created by using Equation 1, is authenticated by determining whether a hash value H(s) created by hashing the secret value s, which is shared by the device A and the device B, is identical to the authentication of the authentication success message value OK_value.

The authentication success message value OK_value obtained by using Equation 2 is authenticated by determining whether a hash value H(R_A$\oplus$1), created by inputting the first random number R_A of the device A to the generation function and the hash function is identical to the authentication success message value transmitted from the device B.

In FIG. 4, the authentication success message, i.e., a flag indicating a value 1 or 0, is transmitted to the device A, whereas, in FIG. 5, an authentication success message having a specific value is transmitted.

The authentication of FIG. 5 can prevent the external attacker from faking the authentication success message. The authentication success message value is obtained by hashing the secret value. Even if the authentication success message is obtained by the external attacker, since the secret value cannot be obtained by the external attacker, the external attacker cannot optionally create the same value as the authentication success message value transmitted by the device B.

That is, the external attacker cannot fake the authentication result of the hashed second random number H'(R_B) performed by the device B in Operation 250 shown in FIG. 2 and, as such, a secure RTT measurement that is safe from an external attack can be performed.

Figure 6:
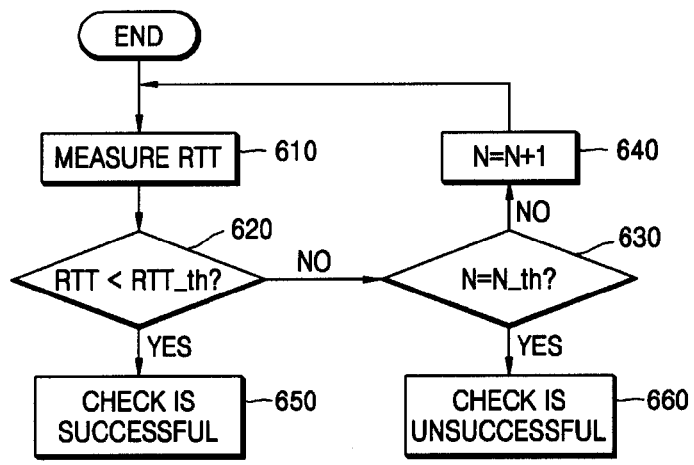
FIG. 6 is a flowchart illustrating a proximity checking method using a method of measuring RTT according to an exemplary embodiment of the present invention.

FIG. 6 is a flowchart illustrating a proximity checking method using the exemplary method of measuring RTT shown in FIG. 2. The proximity check is considered to be successful only if any one of the RTTs, measured at a predetermined frequency, is smaller than a critical value. Such a repetitive RTT measurement prevents the devices A and B from being considered not to be proximate to each other due to increased loads in a network despite the device B being proximate to the device A at a physical distance. The repetitive RTT measurement is indispensable to the proximity check.

In Operation 610, the device A measures a first RTT of the device B using the method of measuring RTT shown in FIG. 2.

In Operation 620, the device A determines whether the RTT obtained by measuring in Operation 610 is smaller than a critical RTT, referred to hereinafter as RTT_th. If the device A determines that the measured RTT is smaller than the critical RTT RTT_th, then Operation 650 is performed. If the device A determines that the measured RTT is not smaller than the critical RTT RTT_th, then Operation 630 is performed.

In Operation 630, the device A determines whether a present measurement frequency N is identical to a critical measurement frequency N_th. If the device A determines that the present measurement frequency N is identical to the critical measurement frequency N_th, then Operation 660 is performed. If the device A determines that the present measurement frequency N is not identical to the critical measurement frequency N_th, then Operation 640 is performed.

In Operation 640, the device A increases the measurement frequency N by 1, and then Operation 610 is performed.

In Operation 650, the device A determines that the proximity check is successful and terminates the proximity check procedure. That is, the device A is determined to be proximate to the device B.

In Operation 660, the device A determines that the proximity check is unsuccessful and terminates the proximity check procedure. That is, the device A is determined not to be proximate to the device B.

Since the proximity checking uses the method of measuring RTT shown in FIG. 2, it requires much less operations than a conventional proximity checking method. The exemplary method of measuring RTT shown in FIG. 2 requires the repetitive RTT measurement but performs an encryption and decryption once and performs a repetitive hashing operation. However, the conventional proximity checking method performs encryptions and decryptions every time that the RTT is measured. The proximity checking method illustrated in FIG. 6 is much more effective than the conventional proximity checking method.

Figure 7:
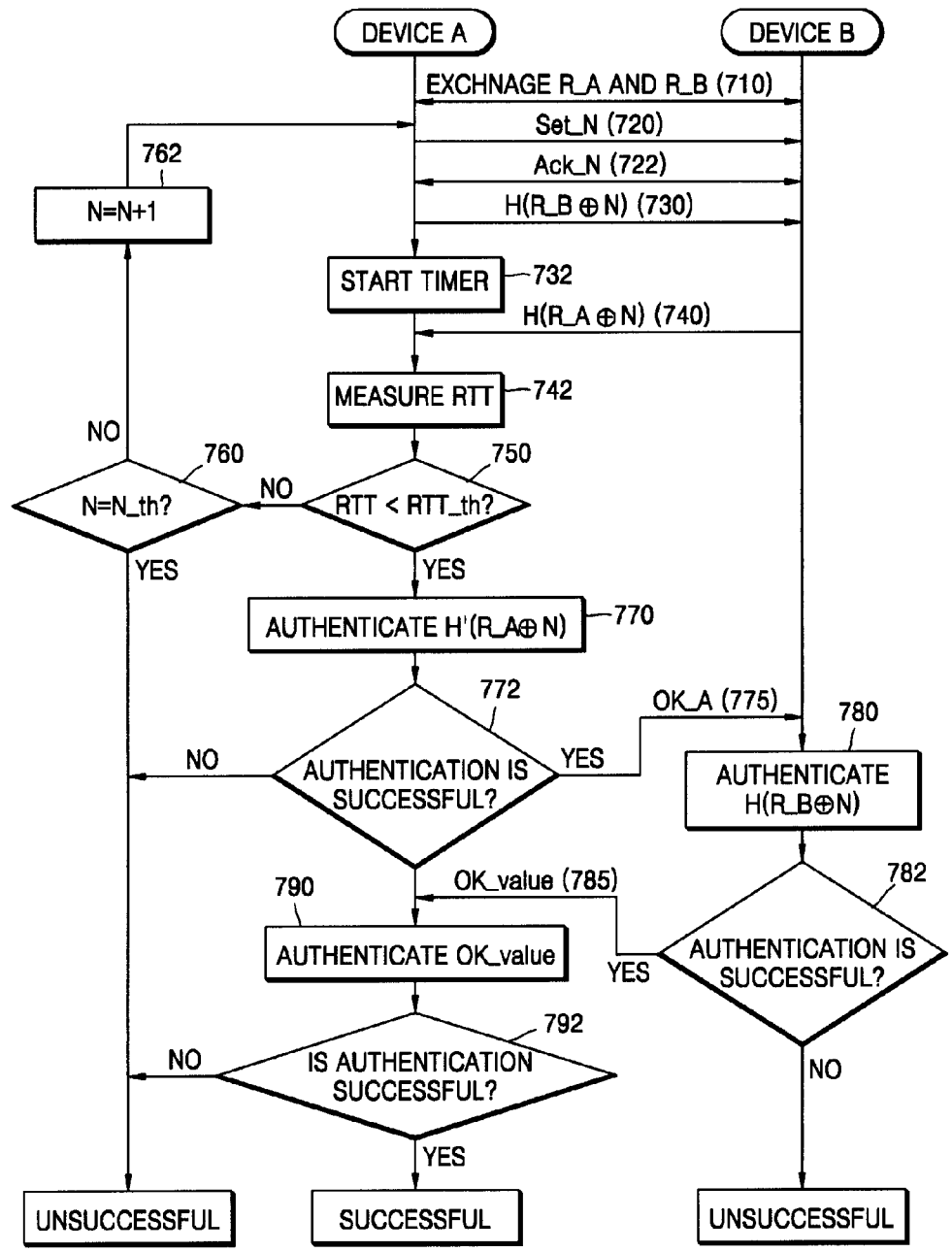
FIG. 7 is a flowchart illustrating a proximity checking method using a Method of measuring RTT according to another exemplary embodiment of the present invention.

FIG. 7 is a flowchart illustrating a proximity checking method using a method of measuring RTT according to another exemplary embodiment of the present invention. Referring to FIG. 7, in Operation 710, the device A generates a first random number R_A, the device B generates a second random number R_B and both devices securely exchange the generated first and second random numbers R_A and R_B.

The term "securely" means that the first and second random numbers R_A and R_B are transmitted to the device A or device B without being obtained by an external attacker. Such a secure transmission is performed, for example, using the method illustrated in FIG. 3.

In Operation 720, the device A transmits a loop setup message Set_N to the device B. The loop setup message Set_N informs the device B of starting the RTT measurement and the order of a present RTT measurement. That is, the loop setup message Set_N includes a present RTT measurement frequency N.

In Operation 722, the device B receives the loop setup message Set_N from the device A and transmits an acknowledge message Ack_N to the device A. The acknowledge message Ack_N acknowledges the present RTT measurement frequency N and acknowledges that the loop setup message Set_N was successfully received.

In Operation 730, the device A creates a hash value H(R_B⊕N) and transmits the created hash value H(R_B⊕N) to the device B. In Operation 732, the device A starts a timer for the RTT measurement. The R_B denotes the second random number transmitted from the device B and the N denotes the present RTT measurement frequency.

In Operation 740, the device B receives the hash value H(R_B⊕N) from the device A, creates a hash value H(R_A⊕N), and transmits the hash value H(R_A⊕N) to the device A. The R_A denotes the first random number transmitted from the device A and the N denotes the present RTT measurement frequency received in Operation 720.

In Operation 742, the device A receives the hash value H(R_A⊕N) from the device B, ends the timer, and measures the RTT.

In Operation 750, the device A determines whether the RTT obtained by measuring in Operation 742 is smaller than a critical RTT RTT_th. If the device A determines that the measured RTT is smaller than the critical RTT RTT_th, then Operation 770 is performed. If the device A determines that the measured RTT is not smaller than the critical RTT RTT_th, Operation 760 is performed.

In Operation 760, the device A determines whether the present RTT measurement frequency N is identical to a critical RTT measurement frequency N_th. If the device A determines that the present RTT measurement frequency N is identical to the critical RTT measurement frequency N_th, then the device A determines the proximity check to be unsuccessful and terminates the proximity check procedure. If the device A determines that the present RTT measurement frequency N is not identical to the critical RTT measurement frequency N_th, then Operation 762 is performed.

In Operation 762, the device A increases the RTT measurement frequency N by 1 and then performs Operation 720.

In Operation 770, if the measured RTT is determined to be smaller than the critical RTT RTT_th in Operation 750, then the device A authenticates the pseudo-hash value H'(R_A⊕N) received in Operation 740. The authentication method is described below.

The device A creates the hash value H(R_A⊕N) using the first random number R_A generated in Operation 710.

The device A determines whether the pseudo-hash value H'(R_A⊕N) received from the device B in Operation 740 is identical to the hash value H(R_A⊕N). The term pseudo-hash value H'(R_A⊕N) is used in this instance since an attacker may transmit an optional hash value in order to fake the RTT, which was described in detail above with respect to Operation 230 shown in FIG. 2.

In Operation 772, if the device A determines that the authentication of the pseudo-hash value H'(R_A⊕N) is successful, then the device A performs Operation 775. If the device A determines that the authentication of the pseudo-hash value H'(R_A⊕N) is unsuccessful, then the device A determines that the proximity check is unsuccessful and terminates the proximity check procedure.

In Operation 775, the device A transmits an authentication success message OK_A to the device B.

In Operation 780, the device B authenticates the pseudo-hash value H'(R_B⊕N) received in Operation 730. The authentication method is described below.

The device B creates the hash value H(R_B⊕N) using the second random number R_B generated in Operation 710.

The device B determines whether the pseudo-hash value H'(R_B⊕N) received from the device A in Operation 740 is identical to the hash value H(R_B⊕N). The term pseudo-hash value H'(R_B⊕N) is used in this instance since an attacker may transmit an optional hash value in order to fake the RTT, which was described in detail above with respect to Operation 230 shown in FIG. 2 and with respect to Operation 740.

In Operation 782, if the device B determines that the authentication of the pseudo-hash value H'(R_B⊕N) is successful, then the device B performs Operation 785. If the device B determines that the authentication of the pseudo-hash value H'(R_B⊕N) is unsuccessful, then the device B determines that the proximity check is unsuccessful and terminates the proximity check procedure.

In Operation 785, the device B creates an authentication success message OK_value and transmits it to the device A. The operation of creating the authentication success message OK_value is similar to that discussed above with respect to Operation 540 shown in FIG. 5. However, the authentication success message OK_value of the modified exemplary embodiment can be created as shown below, $$OK\_value = H(s) = H(f(R\_A)) = H(R\_A \oplus (N+1))$$ (Equation 3)

In Operation 790, the device A authenticates the authentication success message OK_value that is received from the device B. The operation of authenticating the authentication success message OK_value is the same as that discussed above with respect to Operation 550 shown in FIG. 5.

In Operation 792, if the device A determines that the authentication of the authentication success message OK_value is successful, then the device A determines that the proximity check is successful. If the device A determines that the authentication of the authentication success message OK_value is unsuccessful, then the device A determines that the proximity check is unsuccessful and terminates the proximity check procedure.

The proximity checking method in FIG. 7 shows one exemplary embodiment of the method of measuring RTT shown in FIG. 2. Various changes of the equations may be made therein without departing from the spirit and scope of the invention.

The present invention can also be embodied, for example, as computer readable code on a computer readable recording medium. The computer readable recording medium is any data storage device that can store data which can be thereafter read by a computer system. Examples of such a computer readable recording medium include, but are not limited to, read-only memory (ROM), random-access memory (RAM), CD-ROMs, magnetic tapes, floppy disks, optical data storage devices, and carrier waves.

The RTT measurement method of the present invention performs the hashing operation instead of the conventional encryption and decryption operations, thereby greatly reducing the repetitive encryption and decryption operation in the proximity check using the repetitive RTT measurement. In particular, since the hashing operation is much more effective than the conventional encryption and decryption operations, measurement time and efficiency of the proximity check using the repetitive RTT measurement can be increased.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of measuring round trip time (RTT), the method comprising:
   encrypting a first random number generated by a first device and transmitting the encrypted first random number to a second device;
   encrypting a second random number generated by the second device and transmitting the encrypted second random number to the first device;
   decrypting the encrypted second random number received at the first device;
   decrypting the encrypted first random number received at the second device;
   hashing the decrypted first random number to generate a hashed first random number;
   hashing the decrypted second random number to generate a hashed second random number;
   transmitting the hashed second random number from the first device to the second device;
   starting an RTT measurement when the hashed second random number is transmitted by the first device;
   receiving, at the second device, the hashed second random number transmitted from the first device;
   transmitting the hashed first random number from the second device to the first device, after the second device has received the hashed second random number;
   receiving, at the first device, the hashed first random number transmitted from the second device; and
   ending the RTT measurement when the hashed first random number is received by the first device.

2. The method of claim 1, wherein the hashed second random number is obtained by hashing a second random number;
   wherein the RTT measurement is started by starting a timer for the RTT measurement; and
   wherein the RTT measurement is ended by stopping the timer.

3. The method of claim 1, further comprising:
   authenticating the hashed first random number using the first random number; and
   if the authentication of the hashed first random number is successful, determining that the RTT measurement is authentic.

4. A method of measuring round trip time (RTT), the method comprising:
   transmitting a hashed second random number from a first device;
   starting an RTT measurement when the hashed second random number is transmitted;
   receiving a hashed first random number from a second device which received the hashed second random number;
   ending the RTT measurement when the hashed first random number is received;
   authenticating the hashed first random number using a first random number; and
   if the authentication of the hashed first random number is successful, determining that the RTT measurement is authentic,
   wherein authenticating the hashed first random number comprises:
      determining whether a hash value obtained by hashing the first random number is identical to the hashed first random number received from the second device;
      if it is determined that the hash value obtained by hashing the first random number is identical to the hashed first random number received from the second device, transmitting a first authentication success message to the second device;
receiving a second authentication success message from the second device;
authenticating a value of the second authentication success message; and
if the second authentication success message is received, determining that the RTT measurement is authentic.

5. The method of claim 4, wherein a value of the first authentication success message is created by hashing a secret value which is created using the first random number.

6. A computer-readable storage medium comprising a computer program for executing a method of measuring round trip time (RTT), the method comprising:
encrypting a first random number generated by a first device and transmitting the encrypted first random number to a second device;
encrypting a second random number generated by the second device and transmitting the encrypted second random number to the first device;
decrypting the encrypted second random number received at the first device;
decrypting the encrypted first random number received at the second device;
hashing the decrypted first random number to generate a hashed first random number,
hashing the decrypted second random number to generate a hashed second random number;
transmitting the hashed second random number from the first device to the second device;
starting an RTT measurement when the hashed second random number is transmitted by the first device;
receiving, at the second device, the hashed second random number transmitted from the first device;
transmitting the hashed first random number from the second device to the first device, after the second device has received the hashed second random number;
receiving, at the first device, the hashed first random number transmitted from the second device; and
ending the RTT measurement when the hashed first random number is received by the first device.

7. A proximity check method comprising:
encrypting a first random number generated by a first device and transmitting the encrypted first random number to a second device;
encrypting a second random number generated by the second device and transmitting the encrypted second random number to the first device;
decrypting the encrypted second random number received at the first device;
decrypting the encrypted first random number received at the second device;
hashing the decrypted first random number to generate a hashed first random number;
hashing the decrypted second random number to generate a hashed second random number;
transmitting the hashed second random number from the first device to the second device;
starting a round trip time (RTT) measurement when the hashed second random number is transmitted by the first device;
receiving, at the second device, the hashed second random number transmitted from the first device;
transmitting the hashed first random number from the second device to the first device, after the second device has received the hashed second random number;
receiving, at the first device, the hashed first random number transmitted from the second device;
ending the RTT measurement when the hashed first random number is received by the first device; and
checking the proximity of the first and the second devices based on the RTT measurement.

8. The proximity check method of claim 7, wherein checking the proximity of the first and the second devices comprises:
determining whether the RTT measurement is smaller than a critical RTT; and
if it is determined that the RTT measurement is smaller than the critical RTT, determining that the proximity check is successful.

9. The proximity check method of claim 7, wherein the hashed second random number is obtained by hashing and performing an XOR operation on the second random number and a present RTT measurement frequency,
wherein the RTT measurement is started by starting a timer for the RTT measurement, and
wherein the RTT measurement is ended by stopping the timer for the RTT measurement.

10. The method of claim 7, further comprising authenticating the hashed first random number using the first random number and the present RTT measurement frequency.

11. A proximity check method comprising:
transmitting a hashed second random number from a first device;
starting a round trip time (RTT) measurement when the hashed second random number is transmitted;
receiving a hashed first random number from a second device which received the hashed second random number;
ending the RTT measurement when the hashed first random number is received; and
checking the proximity of the first and the second devices based on the RTT measurement,
wherein checking the proximity of the first and the second devices comprises:
determining whether the RTT measurement is smaller than a critical RTT; and
if it is determined that the RTT measurement is smaller than the critical RTT, determining that the proximity check is successful, and
wherein checking the proximity of the first and the second devices further comprises:
if it is determined that the RTT measurement is not smaller than the critical RTT, determining whether a present RTT measurement frequency is identical to a critical RTT measurement frequency; and
if it is determined that the present RTT measurement frequency is smaller than the critical RTT measurement frequency, transmitting a hashed fourth random number from the first device, and starting a second RTT measurement when the hashed fourth random number is transmitted.

12. A computer-readable storage medium comprising a computer program for executing a proximity checking method, the method comprising:
encrypting a first random number generated by a first device and transmitting the encrypted first random number to a second device;
encrypting a second random number generated by the second device and transmitting the encrypted second random number to the first device;
decrypting the encrypted second random number received at the first device;

decrypting the encrypted first random number received at the second device;

hashing the decrypted first random number to generate a hashed first random number;

hashing the decrypted second random number to generate a hashed second random number;

transmitting the hashed second random number from the first device to the second device;

starting a round trip time (RTT) measurement when the hashed second random number is transmitted by the first device;

receiving, at the second device, the hashed second random number transmitted from the first device;

transmitting the hashed first random number from the second device to the first device, after the second device has received the hashed second random number;

receiving, at the first device, the hashed first random number transmitted from the second device;

ending the RTT measurement when the hashed first random number is received by the first device; and checking the proximity of the first and the second devices based on the RTT measurement.

13. A method of measuring a round trip time (RTT), the method comprising:

generating a first random number at a first device;

generating a second random number at a second device;

securely exchanging the generated first and second random numbers between the first device and the second device;

hashing the first random number received at the second device to generate a hashed first random number;

hashing the second random number received at the first device to generate a hashed second random number;

transmitting the hashed first random number from the first device to the second device to measure the RTT from the first device to the second device; and transmitting the hashed second random number from the second device to the first device to measure the RTT from the second device to the first device.

* * * * *